US 9,678,465 B2

United States Patent
Katsuyama

(10) Patent No.: US 9,678,465 B2
(45) Date of Patent: Jun. 13, 2017

(54) IMAGE FORMING APPARATUS WITH LIGHTS THAT HELP GUIDE JAM CLEARANCE

(71) Applicant: Goro Katsuyama, Kanagawa (JP)

(72) Inventor: Goro Katsuyama, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/268,021

(22) Filed: May 2, 2014

(65) Prior Publication Data

US 2014/0334834 A1 Nov. 13, 2014

(30) Foreign Application Priority Data

May 7, 2013 (JP) .................................. 2013-097434
Mar. 7, 2014 (JP) .................................. 2014-044811

(51) Int. Cl.
G03G 15/00 (2006.01)
G06F 3/12 (2006.01)
B65H 43/02 (2006.01)

(52) U.S. Cl.
CPC ......... G03G 15/70 (2013.01); G03G 15/6502 (2013.01); G06F 3/121 (2013.01); B65H 43/02 (2013.01); B65H 2220/04 (2013.01); B65H 2405/11 (2013.01); B65H 2405/113 (2013.01); B65H 2515/60 (2013.01); B65H 2601/11 (2013.01); G03G 15/5016 (2013.01)

(58) Field of Classification Search
CPC ............ B65H 2405/11; B65H 2220/11; G03G 21/1638
See application file for complete search history.

(56) References Cited

U.S. PATENT DOCUMENTS 5,732,321 A * 3/1998 Ishizuka et al. .............. 399/391
5,818,343 A * 10/1998 Sobel ......................... G08B 5/00
                                                                340/815.43
6,658,218 B2 * 12/2003 Krolczyk et al. ................ 399/16
7,341,247 B2 * 3/2008 Hirata et al. ................ 270/58.07
(Continued)

FOREIGN PATENT DOCUMENTS

JP   2000-122361   4/2000
JP   2013-008011   1/2013

*Primary Examiner* — Justin Olamit
(74) *Attorney, Agent, or Firm* — Harness, Dickey & Pierce, P.L.C.

(57) ABSTRACT

An image forming apparatus includes a first light-emitting unit, a second light-emitting unit, and a remaining-recording-medium detector. The first light-emitting unit is arranged on an outer surface of a recording medium setting unit on which recording media are set, and emits light while the recording media are being conveyed from the recording medium setting unit. The second light-emitting unit is arranged on or near an operating member that is to be operated when a recording medium jammed in a main body of the image forming apparatus is removed. The remaining-recording-medium detector detects presence or absence of a recording medium remaining in the main body of the image forming apparatus. The second light-emitting unit emits light when the operating member needs to be operated, based on a result of detection by the remaining-recording-medium detector. The first light-emitting unit and the second light-emitting unit emit light in different manners.

12 Claims, 14 Drawing Sheets

(56) References Cited

U.S. PATENT DOCUMENTS

| | | | |
|---|---|---|---|
| 7,628,483 B2* | 12/2009 | Nakagawa | B41J 29/56 |
| | | | 347/108 |
| 8,177,289 B2* | 5/2012 | Haire | B62D 33/04 |
| | | | 296/182.1 |
| 8,336,984 B2* | 12/2012 | Rzadca | B41J 11/44 |
| | | | 347/16 |
| 8,777,472 B2* | 7/2014 | Okada | G03G 15/5016 |
| | | | 362/551 |
| 2002/0150403 A1 | 10/2002 | Katsuyama et al. | |
| 2002/0195915 A1 | 12/2002 | Katsuyama et al. | |
| 2003/0052956 A1 | 3/2003 | Katsuyama | |
| 2003/0170041 A1 | 9/2003 | Katsuyama | |
| 2004/0114958 A1 | 6/2004 | Katsuyama et al. | |
| 2007/0014580 A1* | 1/2007 | Woo | 399/21 |
| 2011/0181903 A1 | 7/2011 | Katsuyama et al. | |
| 2012/0288295 A1* | 11/2012 | Kitajima | 399/69 |
| 2012/0294645 A1 | 11/2012 | Shimada et al. | |

* cited by examiner

IMAGE FORMING APPARATUS WITH LIGHTS THAT HELP GUIDE JAM CLEARANCE

CROSS-REFERENCE TO RELATED APPLICATIONS

The present application claims priority to and incorporates by reference the entire contents of Japanese Patent Application No. 2013-097434 filed in Japan on May 7, 2013 and Japanese Patent Application No. 2014-044811 filed in Japan on Mar. 7, 2014.

BACKGROUND OF THE INVENTION

1. Field of the Invention

The present invention relates to an image forming apparatus, a recording medium supply device, and an image forming system, each including a first light-emitting member that emits light while recording media are being conveyed from a recording medium setting unit and including a second light-emitting member that indicates an operating member to be operated to remove a recording medium from a main body of the apparatus.

2. Description of the Related Art

In an electrophotographic image forming apparatus, for example, image formation is performed such that a conveying device conveys recording media, such as sheets of paper, from a recording medium setting unit, such as a recording medium tray, storing the recording media, and toner images are transferred by an image forming unit and fixed to the recording media by a fixing device. Furthermore, the recording media on which images are formed may be subjected to post-processing, such as binding or folding. A post-processing device is installed as an optional device separated from the main body of the image forming apparatus. Moreover, in addition to the recording medium tray installed in the main body of the image forming apparatus, a recording medium supply device (large-capacity recording medium supply device or large capacity tray (LCT)) for storing a large number of recording media may be connected, as a separated optional device, to the main body of the image forming apparatus. By arranging the recording medium supply device or the post-processing device for the image forming apparatus as described above, an image forming system is formed.

In some image forming apparatuses as described above, multiple recording medium trays may be arranged according to sizes of recording media such that recording media can be supplied from a feed tray still containing recording media to thereby continue printing without interruption. Such image forming apparatuses are used to continuously perform a large number of printing operations. Furthermore, in such image forming apparatuses, light-emitting members indicate, by luminescent display, that the recording media are being conveyed, that is, the recording medium trays are prohibited from being opened, on outer sides of opening/closing portions of the recording medium trays. With the luminescent display, it becomes possible to prevent the recording medium trays conveying the recording media from being drawn by mistake.

Incidentally, in the image forming apparatus, a recording medium jam may occur due to conveyance failures in various portions of a conveying device inside the main body of the image forming apparatus. The recording medium jam is likely to occur especially in the fixing device. If the recording medium jam occurs, it is necessary to remove the recording medium to the outside of the image forming apparatus. Conventionally, there is a known technology for displaying, on a display unit of an operation panel of the image forming apparatus, a portion where a recording medium is jammed so that the portion where the recording medium is jammed can be recognized from outside.

Japanese Laid-open Patent Publication No. 2000-122361 discloses an image forming apparatus that, when a sheet of paper has not reached a registration sensor, that is, when the sheet of paper is jammed, determines and displays a door corresponding to a sheet remaining position based on information stored in a storage unit that stores therein the number of sheets remaining in the apparatus at the time of occurrence of a jam, and further determines and displays whether there is a remaining sheet after a process of dealing with the jam is completed based on the presence or absence of sheet positional information on a sheet of paper that has not normally been discharged from the apparatus.

However, in the image forming apparatus configured to turn on a light on the outer side of the opening/closing portion of a feed tray being used to supply sheets of paper as described above, if a sheet jammed portion is to be displayed by light on the outer side of the opening/closing portion of the main body of the image forming apparatus, it becomes difficult to distinguish between a portion where a sheet of paper is being supplied, that is, "a portion prohibited from being opened", and a portion where a sheet of paper is jammed, that is, "a portion that needs to be opened".

Therefore, there is a need for an image forming apparatus capable of easily distinguishing between two types of light-emitting members to easily determine whether a light emission signal from each of the light-emitting members indicates recording medium supply operation or a portion where a recording medium is jammed.

SUMMARY OF THE INVENTION

According to an embodiment, an image forming apparatus includes a first light-emitting unit, a second light-emitting unit, and a remaining-recording-medium detector. The first light-emitting unit is arranged on an outer surface of a recording medium setting unit on which recording media are set, and emits light while the recording media are being conveyed from the recording medium setting unit. The second light-emitting unit is arranged on or near an operating member that is to be operated when a recording medium jammed in a main body of the image forming apparatus is removed. The remaining-recording-medium detector detects presence or absence of a recording medium remaining in the main body of the image forming apparatus. The second light-emitting unit emits light when the operating member needs to be operated, based on a result of detection by the remaining-recording-medium detector. The first light-emitting unit and the second light-emitting unit emit light in different manners.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image forming apparatus according to the present invention will be explained below. The image forming apparatus according to the present invention includes a first light-emitting member, which is arranged on an outer surface of a recording medium setting unit and which emits light while recording media are being conveyed, and a second light-emitting member, which indicates an operating member to be operated to remove a recording medium jammed in a main body of the image forming apparatus. The second light-emitting member is arranged on or near the operating member. The image forming apparatus further includes a remaining-recording-medium detecting unit that detects a recording medium remaining in the main body of the image forming apparatus. The second light-emitting member emits light when the operating member needs to be operated based on a result of detection by the remaining-recording-medium detecting unit. The first light-emitting member and the second light-emitting member emit light in different manners.

Basic Configuration of the Image Forming Apparatus

Figure 1:
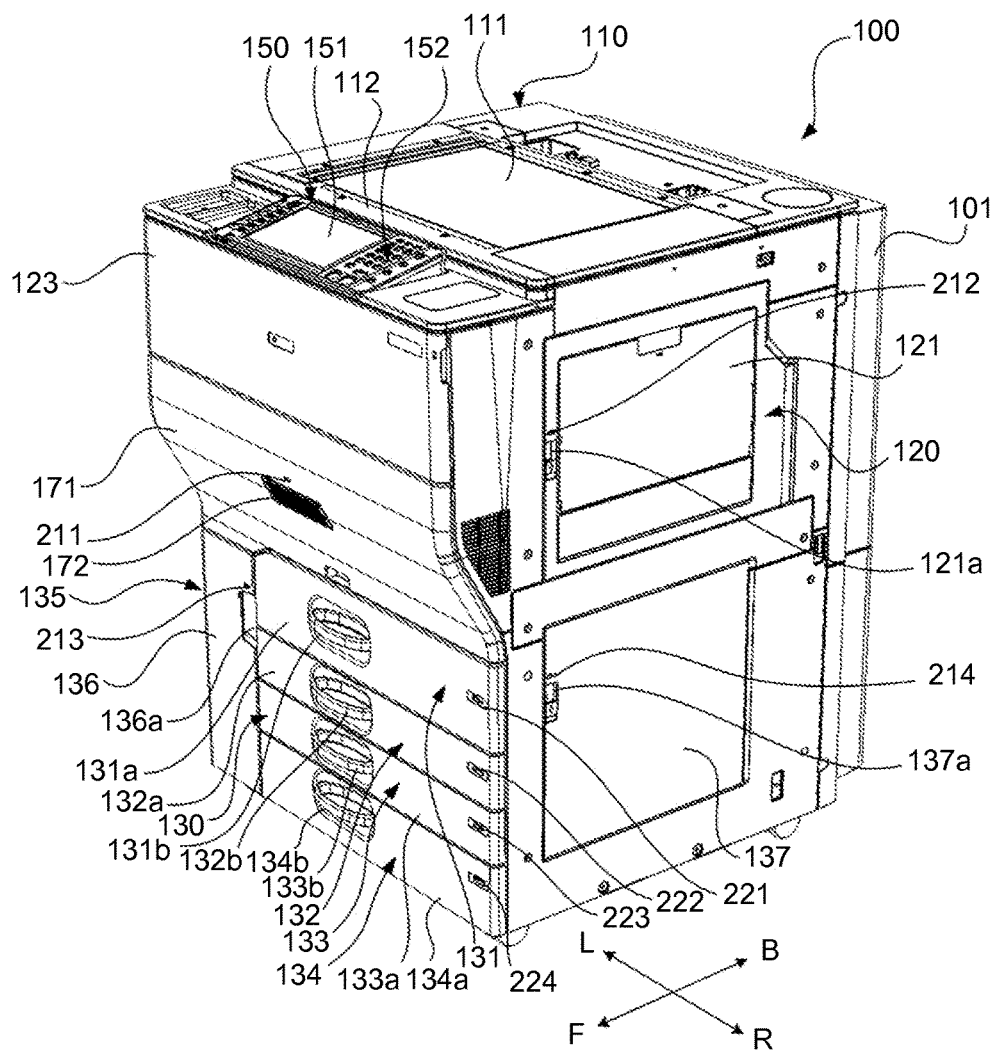
FIG. 1 is a perspective view illustrating appearance of an image forming apparatus to which the present invention is applied.

First, an overall structure of the image forming apparatus will be described. FIG. 1 is a perspective view illustrating an image forming apparatus according to the present invention. An image forming apparatus 100 is a tandem color copier that forms a color image by fixing toner images of four colors of yellow, magenta, cyan, and black on a document. The image forming apparatus 100 includes a document reading unit 110 that optically reads documents, an image forming unit 120 that forms an image on a recording medium such as a sheet of paper by an electrophotographic method, and a recording medium storage unit 13 for storing sheets according to sheet sizes.

The image forming apparatus 100 further includes an operating unit 150 that gives an instruction on operation of the image forming apparatus. The operating unit 150 is arranged on a top surface of the image forming apparatus 100 on an operator stand side (front side), where an operator of the document reading unit 110 stands, along a width direction (left-right direction). On the operating unit 150, a touch member 151, an operation button 152, and the like are arranged. Incidentally, in the drawings, the front side is indicated by F, the rear side is indicated by B, the right side is indicated by R, and the left side is indicated by L.

On the top surface of the document reading unit 110, a contact glass 111 as a document reading surface and a frame 112 are arranged. A pressurizing plate for pressing a document against the contact glass 111 and an auto document feeder (ADF) (both of which are not illustrated) are arranged above the document reading unit 110.

Figure 2:
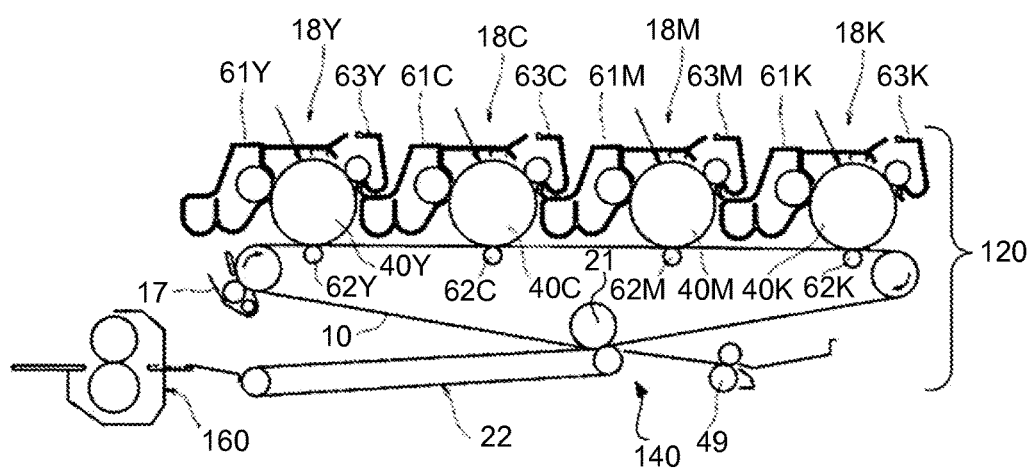
FIG. 2 is a schematic view illustrating an image forming unit of the image forming apparatus.

FIG. 2 is a schematic view illustrating the image forming unit of the image forming apparatus. The image forming unit 120 includes four image formation units 18Y, 18C, 18M, and 18K. In the image formation units 18Y, 18C, 18M, and 18K, developing devices 61Y, 61M, 61C, and 61K for yellow, magenta, cyan, and black develop latent images formed on four photoconductor drums 40Y, 40M, 40C, and 40K exposed by an exposing device, to thereby form toner images on the photoconductor drums 40Y, 40M, 40C, and 40K, respectively. The toner images formed on the photoconductor drums 40Y, 40M, 40C, and 40K are transferred to an intermediate transfer medium 10. A secondary transfer unit 140 then transfers, as secondary transfer, a full-color toner image transferred on the intermediate transfer medium 10 to a recording medium.

The secondary transfer unit 140 includes secondary transfer rollers 21, a conveying belt 22, a cleaning device 17 of the intermediate transfer medium 10, and the like, forms a recording medium conveying path, and serves as a part of the image forming unit 120. Furthermore, a fixing device 160 is arranged in the image forming unit 120. Incidentally, reference symbols 62Y, 62C, 62M, and 62K denote secondary transfer rollers, reference symbols 63Y, 63C, 63M, and 63K denote cleaning devices that remove residual toner on the photoconductor drums 40Y, 40M, 40C, and 40K, respectively, and a reference numeral 49 denotes registration rollers that perform positioning of a conveyed recording medium and then feed the recording medium.

Moreover, a part or all of components included in the image formation units 18Y, 18C, 18K, and 18K form a process cartridge so that they can collectively be drawn from the image forming apparatus 100 to improve the maintainability.

A charging device uniformly charges the surfaces of the photoconductor drums 40Y, 40M, 40C, and 40K along with rotation of the photoconductor drums 40Y, 40M, 40C, and 40K, and the exposing device (not illustrated) applies writing light of laser, LEDs or the like to form electrostatic latent images on the photoconductor drums 40Y, 40M, 40C, and 40K.

Subsequently, the developing devices 61Y, 61M, 61C, and 61K apply toner to the photoconductor drums 40Y, 40M, and 40C to develop the electrostatic latent images, and a primary transfer device transfers the developed images onto the intermediate transfer medium 10. After the image formation, the cleaning devices 63Y, 63C, 63M, and 63K clean the surfaces of the photoconductor drums 40Y, 40M, and 40C by removing residual toner, and a neutralizing device neutralizes the surfaces of the photoconductor drums 40Y, 40M, and 40C for preparation for next image formation. Incidentally, the recording medium conveying path serving as a part of the image forming unit is a conveying path that covers the secondary transfer rollers 21 of the secondary transfer unit 140 and the conveying belt 22 toward the fixing device 160.

Figure 3:
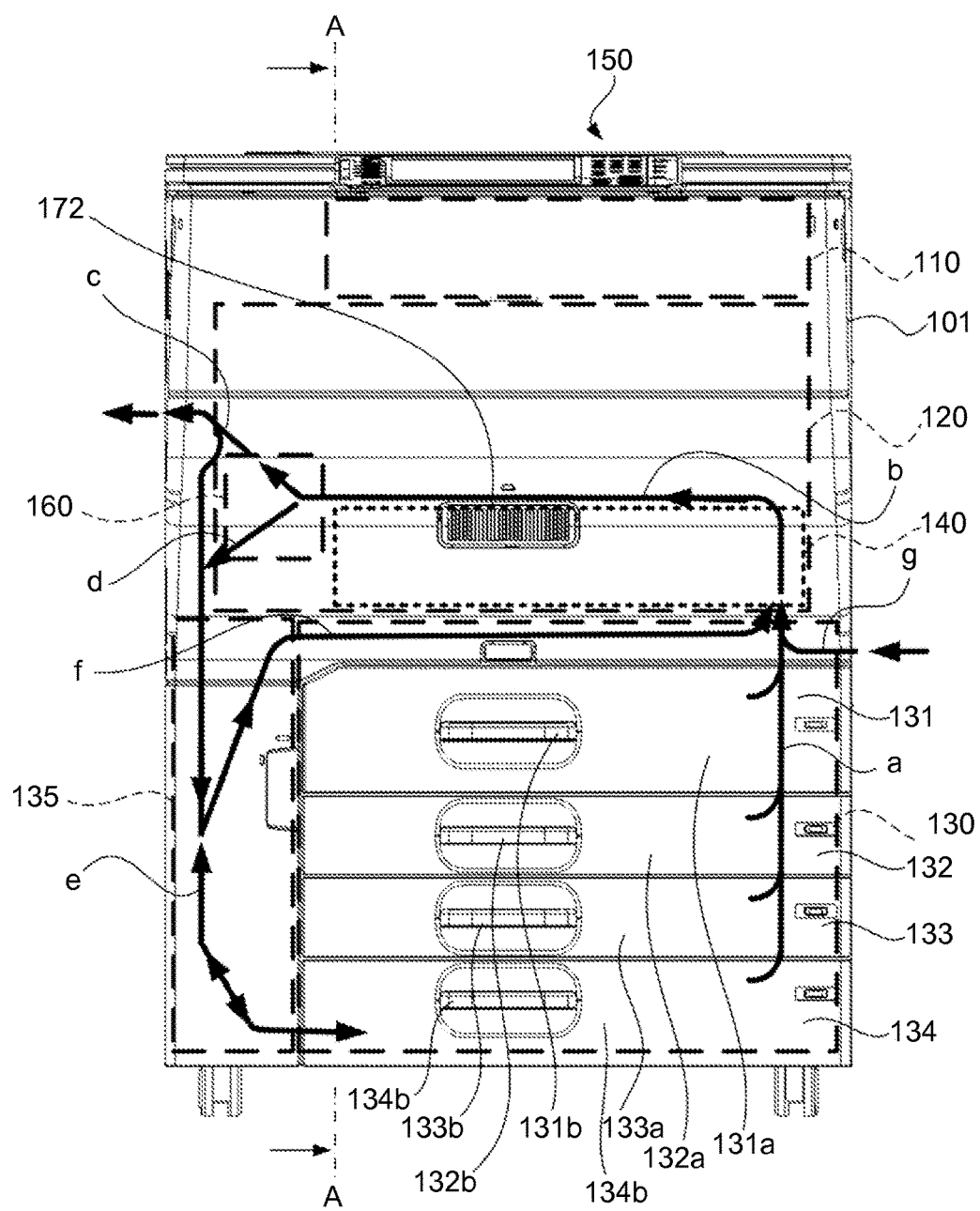
FIG. 3 is a schematic view illustrating a recording medium conveying path of the image forming apparatus.

FIG. 3 is a schematic view illustrating the recording medium conveying path of the image forming apparatus. The recording medium stored in sheet feed trays 131, 132, 133, and 134 of the recording medium storage unit 130 is conveyed by a recording medium conveying device, subjected to image formation by the image forming unit 120, subjected to image fixation by the fixing device 160, and then discharged. In the case of one-side printing, the recording medium conveying device conveys recording media one by one to the image forming unit 120 (path a in the drawing), a toner image formation process and a fixing process is performed on the recording medium (path b in the drawing), and the recording medium is discharged to a discharge tray (not illustrated) (path c). Furthermore, in the case of duplex printing, the recording medium that has been subjected to printing on one side thereof is reversed by a reversing device. In this case, the reversing device moves the recording medium to a purging unit 135 adjacent to the recording medium storage unit 130 (paths d and e), and reverses the recording medium by changing a recording medium conveying direction (path f). Incidentally, in the case of manual feeding, a recording medium is inserted via a manual feed tray (not illustrated) (path g).

The sheet feed tray 131 stores a bundle of recording media (recording media bundle) in predetermined sizes. The sheet feed tray 131 is formed so that it can be drawn toward the front side, and includes a front panel 131a on the front surface thereof. The front panel 131a is arranged entirely along a plane in the vertical direction. A handle 131b for drawing and pushing the sheet feed tray 131 is arranged on the front panel 131a. The handle 131b is formed as a strap-shaped member including an insertion opening in which an operator can put his/her finger. Similarly, the other sheet feed trays 132, 133, and 134 include front panels 132a, 133a, and 134a and handles 132b, 133b, and 134b, respectively. Furthermore, the sheet feed trays 131, 132, 133, and 134 include a sheet feed/conveyance detecting unit 320 (see FIG. 6) as a sensor that detects whether a recording medium is being conveyed.

On right end portions of the front panels 131a, 132a, 133a, and 134a of the sheet feed trays 131, 132, 133, and 134, first light-emitting members 221, 222, 223, and 224 (see FIG. 4) are arranged to externally indicate that recording medium supply operation is disabled, based on a result of detection by the sheet feed/conveyance detecting unit 320.

Figure 4:
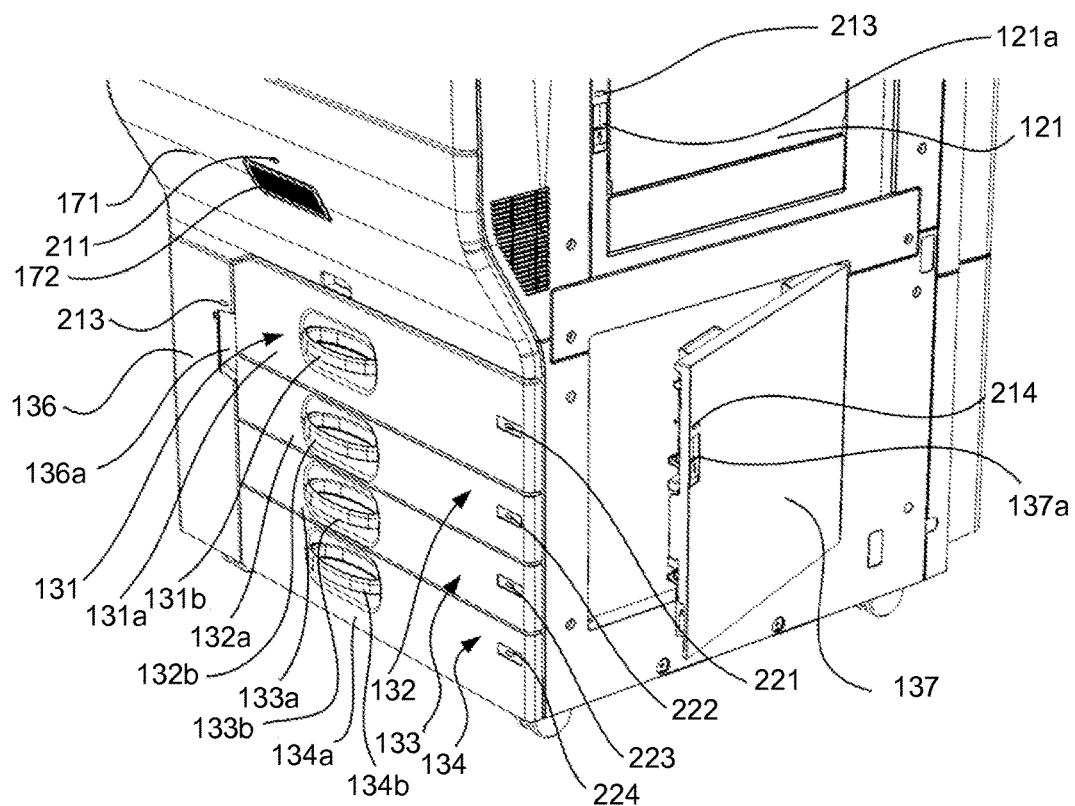
FIG. 4 is a perspective view illustrating a state in which a recording-medium-storage-unit door of the image forming apparatus is opened.

Movable members and operating members of the image forming apparatus 100 will be explained below. FIG. 4 is a perspective view illustrating a state in which a recording-medium-storage-unit door of the image forming apparatus is opened. The image forming apparatus 100 includes a plurality of movable members formed of doors, drawers, or the like to remove, from the apparatus, a recording medium jammed in the apparatus. The image forming unit 120 includes a manual feed door 121, the recording medium storage unit 130 includes a recording-medium-storage-unit door 137 in a vertical conveying path, and the purging unit 135 of the reversing device includes a purging-unit door 136. Furthermore, the image forming apparatus 100 includes a toner replacement door 123. Incidentally, toner containers containing yellow toner, magenta toner, cyan toner, and black toner are arranged on the back side of the toner replacement door 123. Furthermore, a handle 121a, a handle 136a, and a handle 137a are arranged, as the operating members, on the manual feed door 121, the purging-unit door 136, and the recording-medium-storage-unit door 137, respectively.

Figure 5A:
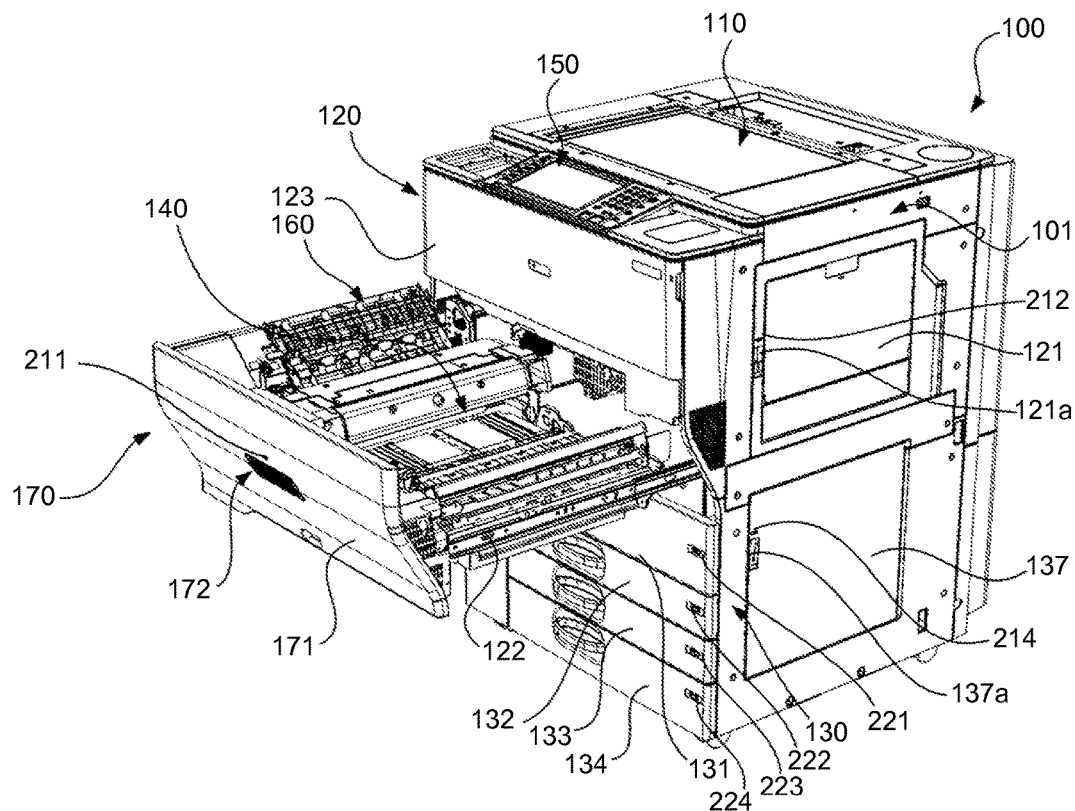
FIG. 5A is a perspective view illustrating a state in which a drawer unit of the image forming apparatus is drawn.
Figure 5B:
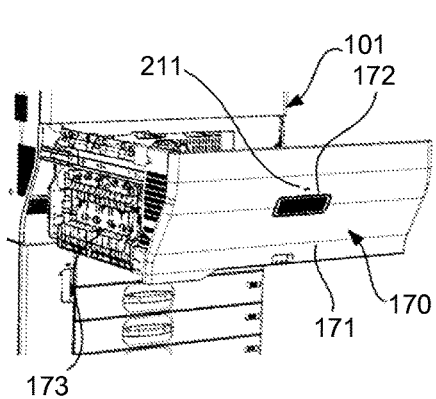
FIG. 5B is a perspective view illustrating a state in which the drawer unit is drawn, when viewed from a different direction.
Figure 5C:
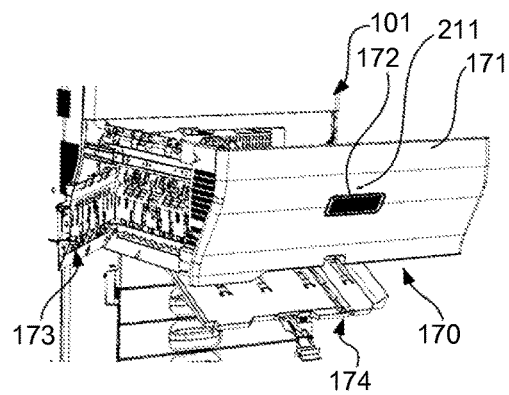
FIG. 5C is a perspective view illustrating a state in which doors of the drawer unit are opened.

Moreover, the secondary transfer unit 140 and the fixing device 160 of the image forming unit 120 are mounted on a drawer unit 170 serving as a movable member that drawable toward the front side from a main body 101 of the image forming apparatus 100. FIG. 5A is a perspective view illustrating a state in which the drawer unit of the image forming apparatus is drawn, FIG. 5B is a perspective view illustrating a state in which the drawer unit is drawn, when viewed from a different direction, and FIG. 5C is a perspective view illustrating a state in which doors of the drawer unit is opened. As illustrated in FIG. 5A, the drawer unit 170 is drawn from the main body 101 along a rail 122. A front plate 171, as a movable member, is arranged on the drawer unit 170.

Furthermore, the front plate 171 of the drawer unit 170 is formed so as to protrude forward relative to the front panels 131a, 132a, 133a, and 134a. The front plate 171 is downwardly inclined toward the rear side. On the front plate 171 serving as an outer surface of the drawer unit 170, a drawer operation portion 172 is formed that serves as an operating member to perform drawing operation and pushing operation on the drawer unit 170. Furthermore, as illustrated in FIGS. 5B and 5C, the drawer unit 170 includes a side door 173, as a movable member, to remove a recording medium from the side of the fixing device 160 and a lower door 174, as a movable member, to remove a recording medium from a lower side of the secondary transfer unit 140. Handles (not illustrated), as the operating members, are arranged on the side door 173 and the lower door 174.

A second light-emitting member is arranged on each of the operating members or near each of the operating members. Specifically, a drawer light-emitting member 211 is arranged near the drawer operation portion 172 of the drawer unit 170, a manual-feed-door light-emitting member 212 is arranged near the handle 121a of the manual feed door 121, a purging-unit-door light-emitting member 213 is arranged near the handle 136a of the purging-unit door 136, and a recording-medium-storage-unit-door light-emitting member 214 is arranged near the handle 137a of the recording-medium-storage-unit door 137.

First Embodiment

Figure 6:
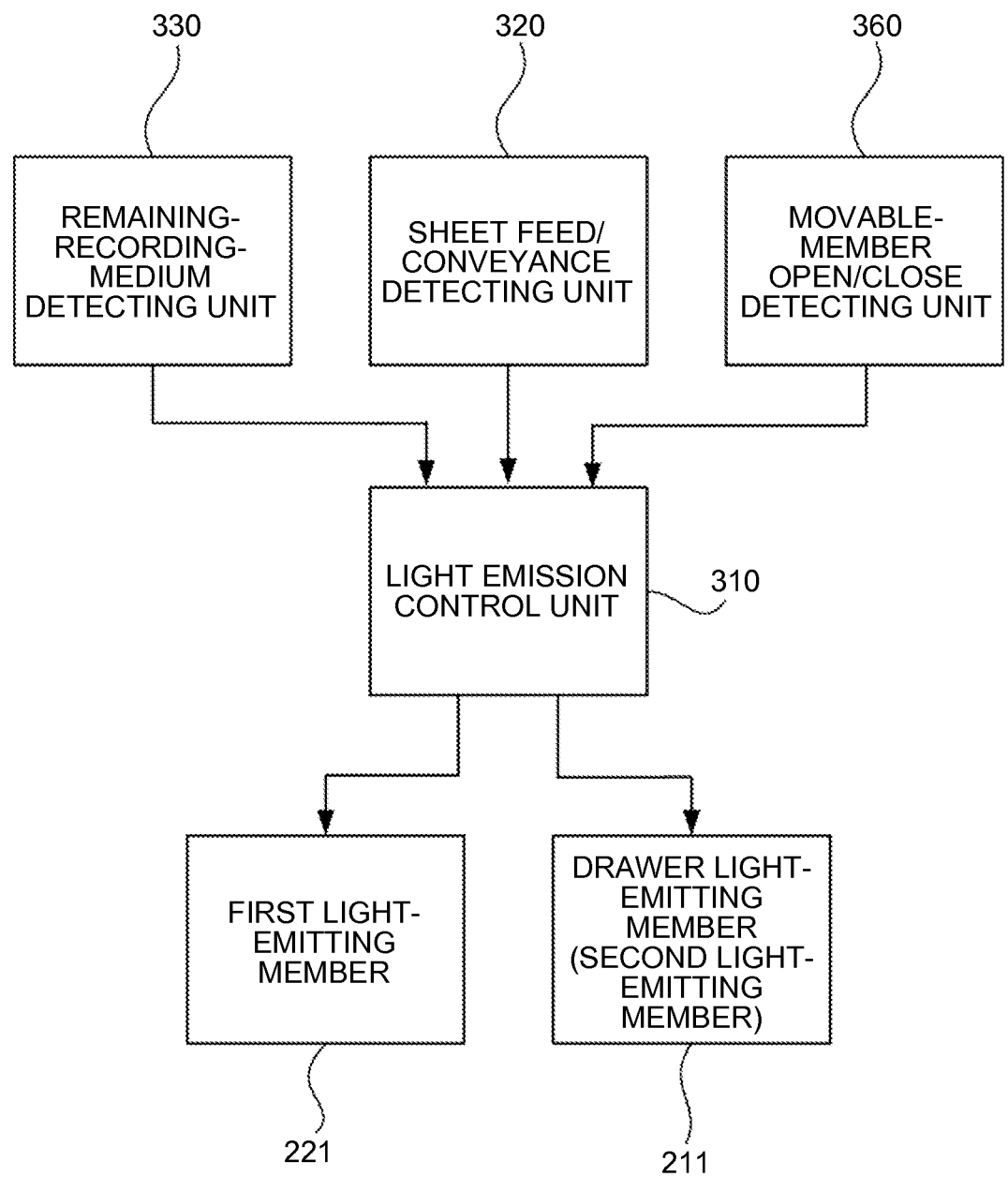
FIG. 6 is a block diagram illustrating a light emission control system of an image forming apparatus according to a first embodiment of the present invention.

The image forming apparatus 100 according to a first embodiment will be explained below. In the first embodiment, light emission of the first light-emitting member and the second light-emitting member in the image forming apparatus 100 configured as described above is controlled as described below. FIG. 6 is a block diagram illustrating a light emission control system of the image forming apparatus according to the first embodiment of the present invention. The light emission control system includes a light emission control unit 310 that controls drive of the first light-emitting member 221 and the drawer light-emitting member 211 serving as the second light-emitting member, and include the sheet feed/conveyance detecting unit 320, a remaining-recording-medium detecting unit 330, and a movable-member open/close detecting unit 360.

The light emission control unit 310 controls light emission of the first light-emitting member 221 and the drawer light-emitting member 211 based on results of detection by the sheet feed/conveyance detecting unit 320, the movable-member open/close detecting unit 360, and the remaining-recording-medium detecting unit 330.

The sheet feed/conveyance detecting unit 320 detects a sheet feed state of the sheet feed tray 131. The movable-member open/close detecting unit 360 detects an open/close state of the drawer unit 170 serving as the movable member. The remaining-recording-medium detecting unit 330 detects that a recording medium is remaining in the image forming apparatus 100, that is, detects in which position a recording medium is jammed (paper jam).

The light emission control unit 310 causes the first light-emitting member 221 to emit light when the sheet feed/conveyance detecting unit 320 detects sheet feed/conveyance, and does not cause the first light-emitting member 221 to emit light when sheet feed/conveyance is not detected. Furthermore, when the remaining-recording-medium detecting unit 330 detects that a recording medium is remaining in the drawer unit 170, the light emission control unit 310 causes the drawer light-emitting member 211 to emit light to designate the drawer operation portion 172 for operating the drawer unit 170. By causing the drawer light-emitting member 211 to emit light, the drawer operation portion 172 is designated as the operating member to be operated to remove the recording medium.

In the first embodiment, the first light-emitting member 221 and the drawer light-emitting member 211 emit light in different manners so that a user can easily distinguish them from each other. For example, the first light-emitting member 221 emits light in the wavelength range of 460 nanometers (nm) to 480 nm (blue), and the drawer light-emitting member 211 emits light in the wavelength range of 610 nm to 630 nm (red) different from that of the first light-emitting member 221. Therefore, even when the amounts of light emitted by the first light-emitting member 221 and the drawer light-emitting member 211 are small, a user is able to clearly distinguish them from each other and is less likely to mistakenly operate the sheet feed tray 131 and the drawer unit 170.

Each of the first light-emitting member 221 and the drawer light-emitting member 211 serving as the second light-emitting member has a structure in which a light source, such as a light emitting diode (LED) element, and a light guide member made of transparent synthetic resin, are combined. The light guide member includes a light incidence surface on one side and a light emission surface on the other side.

As an embodiment to distinguish between light emitted by the first light-emitting member and light emitted by the second light-emitting member, the light emission control unit 310 may set a different light emission cycle for each of the first light-emitting member 221 and the drawer light-emitting member 211, in addition to setting a different color for each emitted light as described above. For example, it may be possible to cause the first light-emitting member 221 to emit continuous light and cause the drawer light-emitting member 211 to emit blinking light.

Incidentally, it is possible to control light emission of the first light-emitting members 222, 223, and 224 of the other sheet feed trays 132, 133, and 134 in the same manner as described above, in addition to controlling the first light-emitting member 221 arranged on the sheet feed tray 131. Furthermore, it is possible to control light emission of the manual-feed-door light-emitting member 212, the purging-unit-door light-emitting member 213, the recording-medium-storage-unit-door light-emitting member 214, and the like serving as the other second light-emitting members in the same manner as described above, in addition to controlling the drawer light-emitting member 211 serving as the second light-emitting member.

As described above, according to the image forming apparatus 100 of the first embodiment, it becomes possible to easily distinguish between the first light-emitting member arranged on the recording medium storage unit and the second light-emitting member indicating the operating member used to remove a recording medium in a jammed state, without causing any confusion. Therefore, it becomes possible to prevent erroneous operation, in which "a portion that needs to be opened" is not opened and "a portion prohibited from being opened" is opened.

Second Embodiment

An image forming apparatus according to a second embodiment of the present invention will be explained below. As described above, a recording medium may be jammed (paper jam may occur) in the image forming apparatus 100, and such a paper jam is likely to occur in the fixing device 160. Incidentally, because the fixing device 160 is arranged on the drawer unit 170, it is necessary to draw the drawer unit 170 to remove the recording medium from the fixing device 160. However, if the image forming apparatus 100 is configured to operate at high speed, even when the image forming apparatus 100 is suspended due to the paper jam, recording media sequentially conveyed from the recording medium storage unit 130 may reach the path a, the path b, the path d, and the path e illustrated in FIG. 3. In this state, if the drawer unit 170 is drawn, the recording media located on the respective paths may be torn.

Specifically, in the image forming apparatus 100, separable portions are provided, at which the recording medium conveying paths are separated when the drawer unit 170 is drawn. If the drawer unit 170 is drawn while recording media are located in the separable portions, the recording media may be torn between the main body 101 of the image forming apparatus 100 and the drawer unit 170.

Therefore, the image forming apparatus 100 causes the second light-emitting members to emit light for the operating members of the movable members to be opened to remove the recording media, in order of removal of the recording media. The second light-emitting members include the drawer light-emitting member 211 arranged on the upper side of the drawer operation portion 172 of the drawer unit 170, the manual-feed-door light-emitting member 212 arranged near the handle 121*a* of the manual feed door 121, the purging-unit-door light-emitting member 213 arranged near the handle 136*a* of the purging-unit door 136, and the recording-medium-storage-unit-door light-emitting member 214 arranged near the handle 137a of the recording-medium-storage-unit door 137.

Each of the second light-emitting members includes an LED element and emits light in the wavelength range of 610 nm to 630 nm (red) different from that of the first light-emitting members. The first light-emitting members 221, 222, 223, and 224 are arranged in the same positions as described in the first embodiment, and emit blue light.

Figure 7:
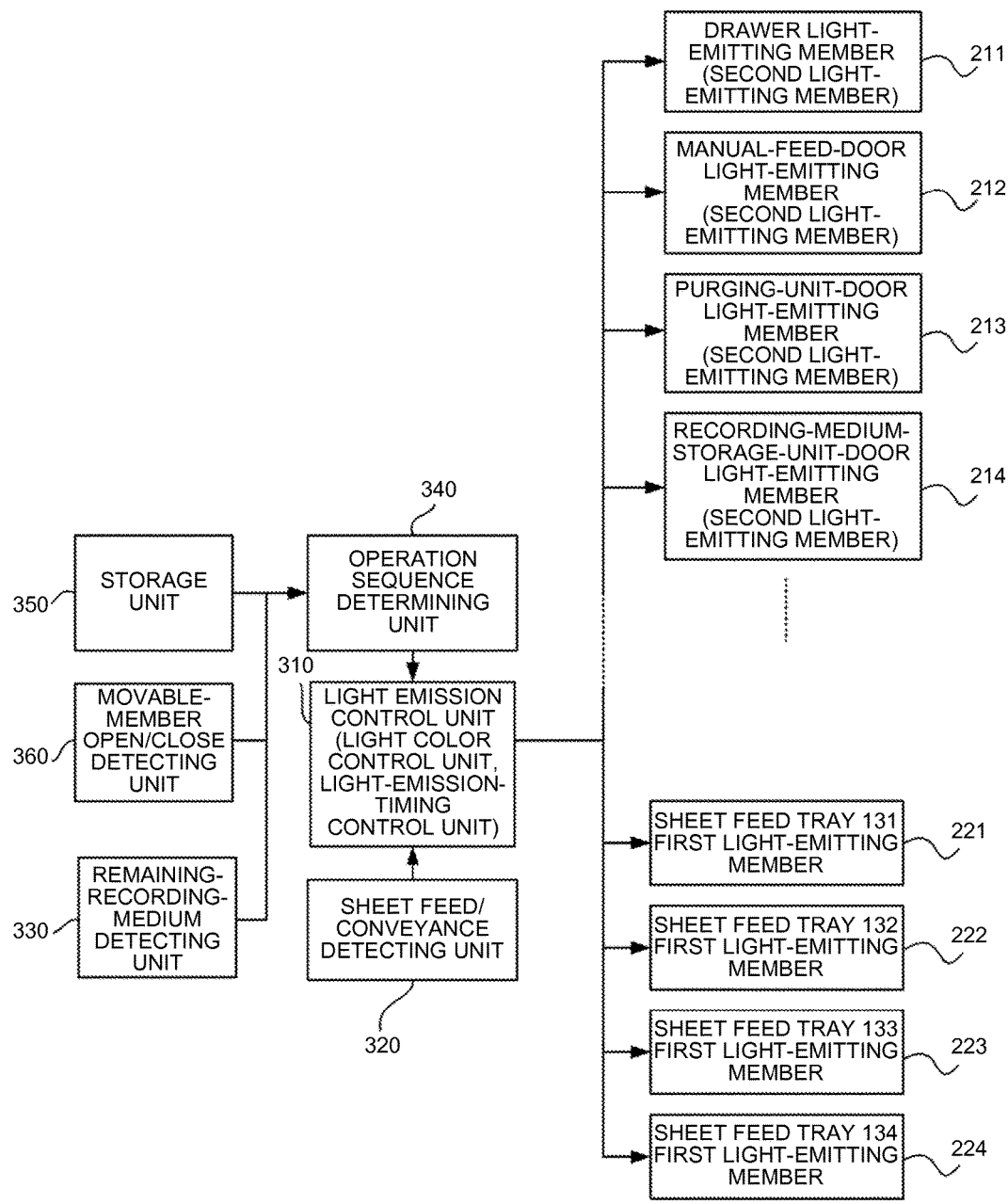
FIG. 7 is a block diagram illustrating a light emission control system of an image forming apparatus according to a second embodiment of the present invention.

FIG. 7 is a block diagram illustrating a light emission control system of the image forming apparatus according to the second embodiment of the present invention. The light emission control system controls light emission of the first light-emitting members 221, 222, 223, and 224 and light emission of the drawer light-emitting member 211, the manual-feed-door light-emitting member 212, the purging-unit-door light-emitting member 213, and the recording-medium-storage-unit-door light-emitting member 214 serving as the second light-emitting members. The light emission control system includes the light emission control unit 310, the sheet feed/conveyance detecting unit 320, the remaining-recording-medium detecting unit 330, an operation sequence determining unit 340, a storage unit 350, the movable-member open/close detecting unit 360, and the remaining-recording-medium detecting unit 330.

The second light-emitting members are arranged not only in the positions as described above but also on the side door 173 and the lower door 174 (see FIG. 5C) in the drawer unit 170 and on or near the operating members of the movable members that need to be moved to remove recording media. Examples of the operating members include a release lever of a door, a handle of a conveying guide plate, a sheet feed button, and a sheet feed knob.

The first light-emitting members 221, 222, 223, and 224 and the second light-emitting members such as the drawer light-emitting member 211, the manual-feed-door light-emitting member 212, the purging-unit-door light-emitting member 213, and the recording-medium-storage-unit-door light-emitting member 214 are connected to and controlled by the light emission control unit 310.

The movable-member open/close detecting unit 360 detects an open/close state of each of the movable members moved by the operating members. Specifically, the open/close states of the movable members such as the manual feed door 121, the purging-unit door 136, the recording-medium-storage-unit door 137, the drawer unit 170, and the like are detected. The remaining-recording-medium detecting unit 330 detects a position where a recording medium is remaining. The detecting units as described above are formed of microswitches, optical sensors, or the like.

The storage unit 350 stores therein operation sequence data, in which an operation sequence of the operating members needed to remove recording media from respective remaining positions detected by the remaining-recording-medium detecting unit 330 is determined for each combination of the operating states of the operating members to be detected by the movable-member open/close detecting unit 360. Specifically, the storage unit 350 stores therein an operation sequence of the operating members to be operated to remove recording media while the recording media are remaining, for each combination of recording medium remaining positions and the open/close states of the movable members.

The operation sequence determining unit 340 determines the operation sequence of the operating members needed to remove recording media actually remaining in the conveying device, based on a result of detection by the remaining-recording-medium detecting unit 330 and a result of detection by the movable-member open/close detecting unit 360 by referring to the operation sequence data.

The light emission control unit 310 causes the second light-emitting units to emit blinking light in the sequence determined by the operation sequence determining unit 340. The blinking is performed such that an operating member to be operated next is designated after operation of one operating member is completed.

The sequence of blinking of the second light-emitting member will be explained below. In the following, an example will be explained in which a recording medium is jammed in the vertical conveying path (on the inner side of the recording-medium-storage-unit door 137) of the recording medium storage unit 130 of the image forming apparatus 100. In this case, the recording-medium-storage-unit-door light-emitting member 214 first emits blinking light. If the recording-medium-storage-unit door 137 is opened to remove the recording medium from the vertical conveying path of the recording medium storage unit 130 and if the recording-medium-storage-unit door 137 is closed after the recording medium is removed, the recording-medium-storage-unit-door light-emitting member 214 is turned off. This completes a recording medium removal process.

The process as described above is also performed when a recording medium is jammed in the purging unit 135 or the fixing device 160 in the drawer unit 170. In this case, recording media may be located in the separable portions. In this case, the operation sequence determining unit 340 reads, from the storage unit 350, a sequence of blinking of the second light-emitting units corresponding to the operation sequence of the operating members needed to remove the recording media from the separable portions without tearing the recording media. The light emission control unit 310 sequentially causes the second light-emitting units designating the operating members of the movable members to emit blinking light according to the read sequence.

Incidentally, the light emission control unit 310 may operate as a light color control unit to control light emitted from each of the light-emitting members. Specifically, the light emission control unit 310 may set the color of light emitted by the first light-emitting member to blue and set the color of light emitted by the second light-emitting member to red. In this case, the first light-emitting member and the second light-emitting member are provided with color-variable LED elements with the same specifications. In this state, the light emission control unit 310 sets the colors of light by changing light emission signals for driving the LED elements. In this case, a single type of the LED element is used, so that costs for components can be reduced. Furthermore, a user of the image forming apparatus 100 is allowed to arbitrarily change the colors of the light-emitting members. Incidentally, it may be possible to use other light-emitting elements instead of the LED elements.

Furthermore, the light emission control unit 310 may operate as a light-emission-timing control unit. In this case, the light emission control unit 310 causes the first light-emitting members 221, 222, 223, and 224 to emit continuous light. Meanwhile, the light emission control unit 310 causes the second light-emitting members such as the drawer light-emitting member 211, the manual-feed-door light-emitting member 212, the purging-unit-door light-emitting member 213, and the recording-medium-storage-unit-door light-emitting member 214 to emit blinking light by turning them on and off at predetermined intervals. This makes it possible to, together with setting the different colors of light, clearly distinguish one light from the other.

Furthermore, because the light emission cycle of the first light-emitting members 221, 222, 223, and 224 and the light emission cycle of the second light-emitting members differ from each other, even a user who has a difficulty in distinguishing light by colors because of a color vision deficiency is able to visually distinguish one light from the other. Moreover, it is advantageous that a user may easily know that static light indicates a normal state (i.e., a recording medium is being conveyed) to indicate "a portion prohibited from being opened" while blinking light indicates an abnormal state (i.e., a recording medium is jammed) to indicate "a portion that needs to be opened". The light emission cycles may be changed arbitrarily.

Figure 8A:
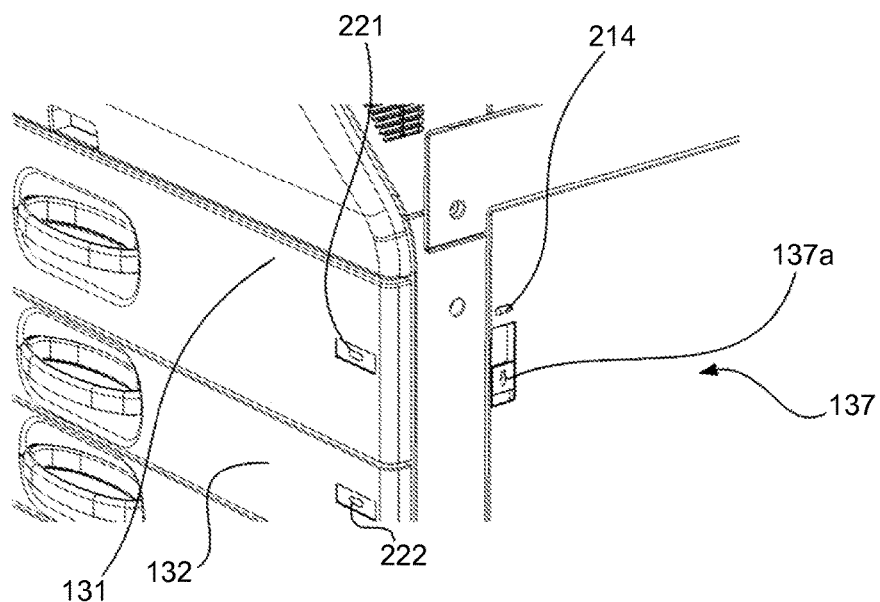
FIG. 8A is a perspective view of a recording-medium-storage-unit door and a sheet feed tray of the image forming apparatus.

Next, the configurations of the first light-emitting members 221, 222, 223, and 224 and the second light-emitting members will be explained. As described above, in the image forming apparatus 100 according to the second embodiment, each of the first light-emitting member and the second light-emitting member includes a combination of the LED element and the light guide member. FIG. 8A is a perspective view of the recording-medium-storage-unit door and the sheet feed tray of the image forming apparatus, and FIG. 8B is an enlarged perspective view of the recording-medium-storage-unit door and the sheet feed tray illustrated in FIG. 8A.

In the image forming apparatus 100 according to the second embodiment, light-emitting portions of the first light-emitting members 221, 222, 223, and 224, that is, tips of the light guide members, are located so as not to protrude outward relative to mounting surfaces of the light guide members. The first light-emitting member 221 is arranged on the inner side of the front panel 131a of the sheet feed tray 131, and a non-transparent decal 280 with a transparent portion 281 is attached to the front side of the first light-emitting member 221 of the front panel 131a. Therefore, the light emission surface of the first light-emitting member 221 is formed as a plane.

Incidentally, it may be possible to arrange frames surrounding the light emission surfaces of the respective light guide members on the mounting surfaces of the light-emitting members, and to form the frames of the first light-emitting members and the frames of the second light-emitting members in different shapes. For example, the planar shapes of the frames of the first light-emitting members may be rectangles, while the planar shapes of the frames of the second light-emitting members may be ellipses. As the frames, decals attachable to the mounting surfaces may be used.

Figure 8B:
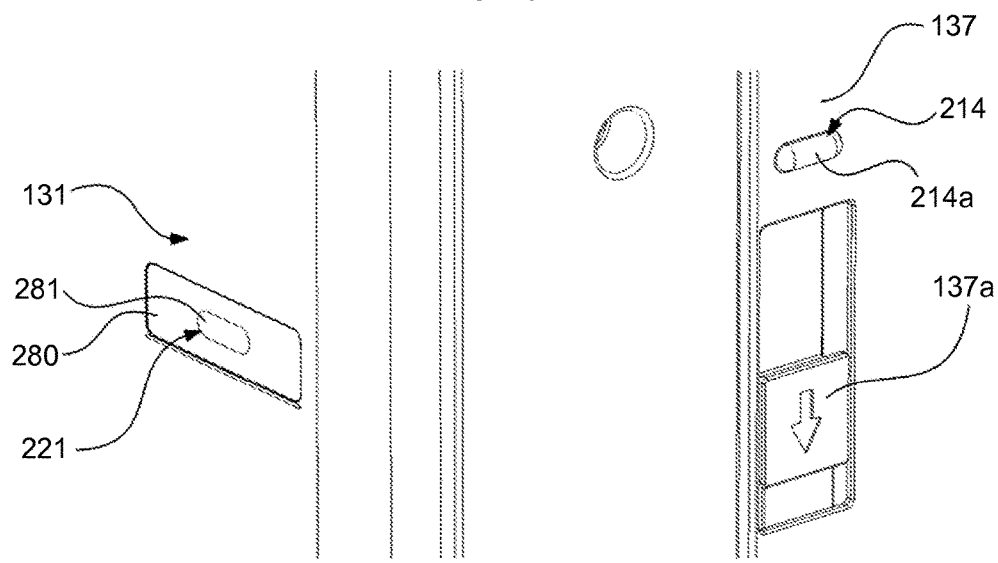
FIG. 8B is an enlarged perspective view of the recording-medium-storage-unit door and the sheet feed tray illustrated in FIG. 8A.

Meanwhile, the recording-medium-storage-unit-door light-emitting member 214 serving as the second light-emitting member has a three-dimensional shape as illustrated in FIG. 8B, in which an emission portion 214a as a light-emitting portion formed on a tip of the light guide member protrudes outward relative to the surface of the recording-medium-storage-unit door 137 serving as a mounting surface. In this example, the emission portion 214a has a cylindrical shape with spherical surfaces on both ends thereof.

The light emission surface of the first light-emitting member 221 is formed as a plane, so that the three-dimensional shape of the recording-medium-storage-unit-door light-emitting member 214 can easily be distinguished by comparison. As described above, the first light-emitting member 221 that is visible on the front surface of the image forming apparatus 100 can be viewed without any difficulty even when it is formed as a plane, but the recording-medium-storage-unit-door light-emitting member 214 is not easily viewed because it is arranged on the right side of the apparatus. However, the recording-medium-storage-unit-door light-emitting member 214 is formed in the three-dimensional shape so as to protrude from the surface of the recording-medium-storage-unit door 137, so that the recording-medium-storage-unit-door light-emitting member 214 becomes visible.

Figure 9A:
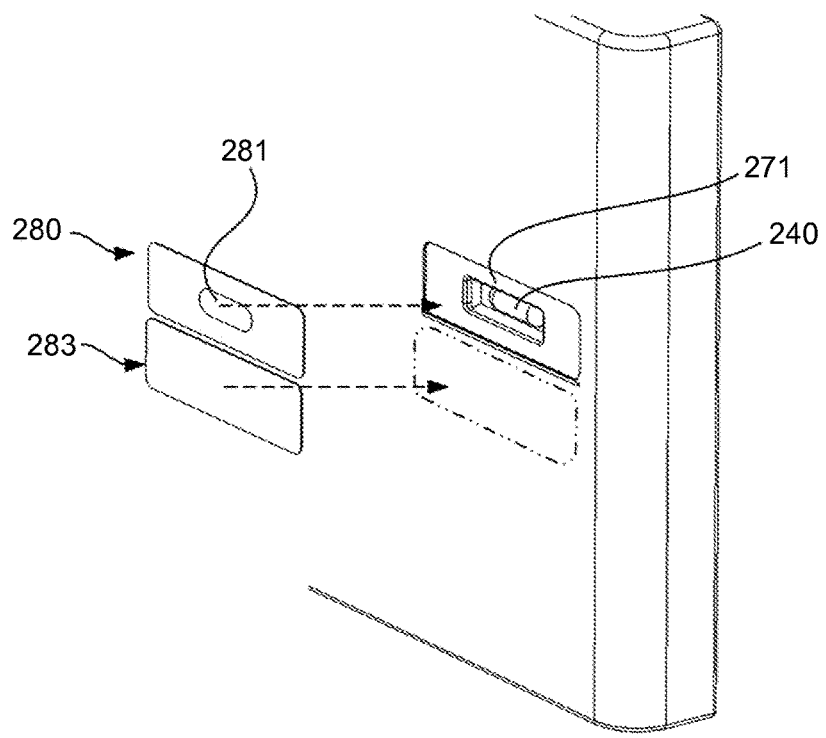
FIG. 9A is a perspective view illustrating a surface member arranged on a surface side of a light-emitting member, when a first light-emitting member is used.
Figure 9B:
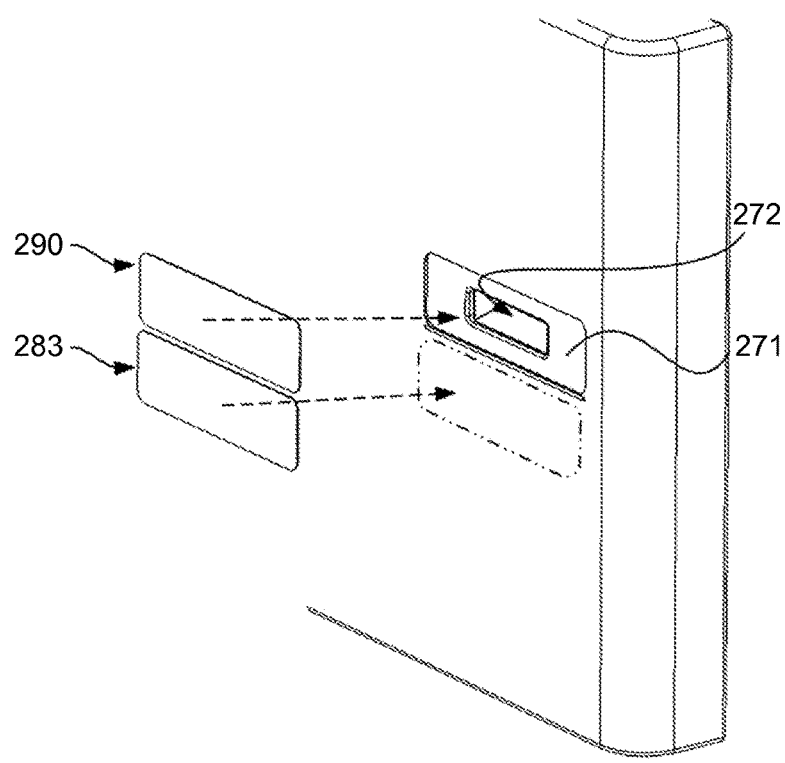
FIG. 9B is a perspective view illustrating a surface member arranged on the surface side of the light-emitting member, when the first light-emitting member is not used.

As the image forming apparatus 100, an image forming apparatus may be manufactured, in which the first light-emitting member of any of the sheet feed trays 131, 132, 133, and 134 need not emit light. Image forming apparatuses enabled to form images at high speed are expected to perform continuous operation by supplying recording media during image formation. However, in certain use states, the continuous operation may not be performed and the first light-emitting member may not be needed for any of the sheet feed trays. In this case, the first light-emitting member 221, 222, 223, or 224 is not arranged in the sheet feed tray 131, 132, 133, or 134, and a surface member is attached to an arrangement position of the first light-emitting member 221, 222, 223, or 224 to make the portion unnoticeable. FIG. 9A is a perspective view illustrating the surface member arranged on a surface side of the light-emitting member, when the first light-emitting member is used, and FIG. 9B is a perspective view illustrating the surface member arranged on the surface side of the light-emitting member, when the first light-emitting member is not used.

In a portion where a first light-emitting member 240 is used, as illustrated in FIG. 9A, the decal 280 with the transparent portion 281, through which light from the first light-emitting member 240 is transmitted, is attached to an arrangement position 271 of the first light-emitting member 240. Incidentally, a reference numeral 283 denotes a decal containing the stage number of the sheet feed tray.

In contrast, in a portion where a first light-emitting member is not used, as illustrated in FIG. 9S, it may be possible to attach a decal 290 made of a non-transparent material that prevents a hole 272 of the arrangement position 271 of the first light-emitting member from being viewed. It may be possible to write the stage number of the sheet feed tray in the decal 290 and write the size of recording media in the decal 283.

Specific examples of the first light-emitting member and the second light-emitting member of the image forming apparatus 100 will be explained below. Each of the first light-emitting members 221, 222, 223, and 224 and each of the drawer light-emitting member 211, the manual-feed-door light-emitting member 212, the purging-unit-door light-emitting member 213, and the recording-medium-storage-unit-door light-emitting member 214 serving as the second light-emitting members includes the same LED element and a light guide member formed in a shape suitable for each arrangement position. Specifically, the shape of the light guide member is appropriately changed depending on a space for arranging the light-emitting member in the arrangement position or depending on a moving state. The light guide member has a shape corresponding to the arrangement position, and outputs light from the LED element via the emission portion by internal reflection.

If the conditions such as arrangement spaces permit, the LED element and the light guide member are joined as an integrated component. Furthermore, the light guide member is arranged on the movable member configured to move and the LED element is fixed to the apparatus main body such that when the movable member is in a closed state, the LED element and the light guide member come close to or in contact with each other to enable the light guide member to guide light from the LED element. Furthermore, as the orientation, the posture of the LED element may be changed in various ways with respect to a light display surface on which light is to be displayed.

When the LED element emits light at a right angle with respect to the light display surface, the light guide member may be formed in a linear shape. Furthermore, when the LED element emits light at a certain angle with respect to the light display surface, a reflecting surface is formed on the light guide member. As described above, when the configurations of the light guide members are changed depending on the arrangement positions, and if the same LED elements are used, the intensities of light emitted in different arrangement positions differ from one another. Therefore, it is preferable to adjust the brightness of the LED elements or the transparency of the light guide members so that the display in all of the portions can be recognized as the same intensity.

Figure 10:
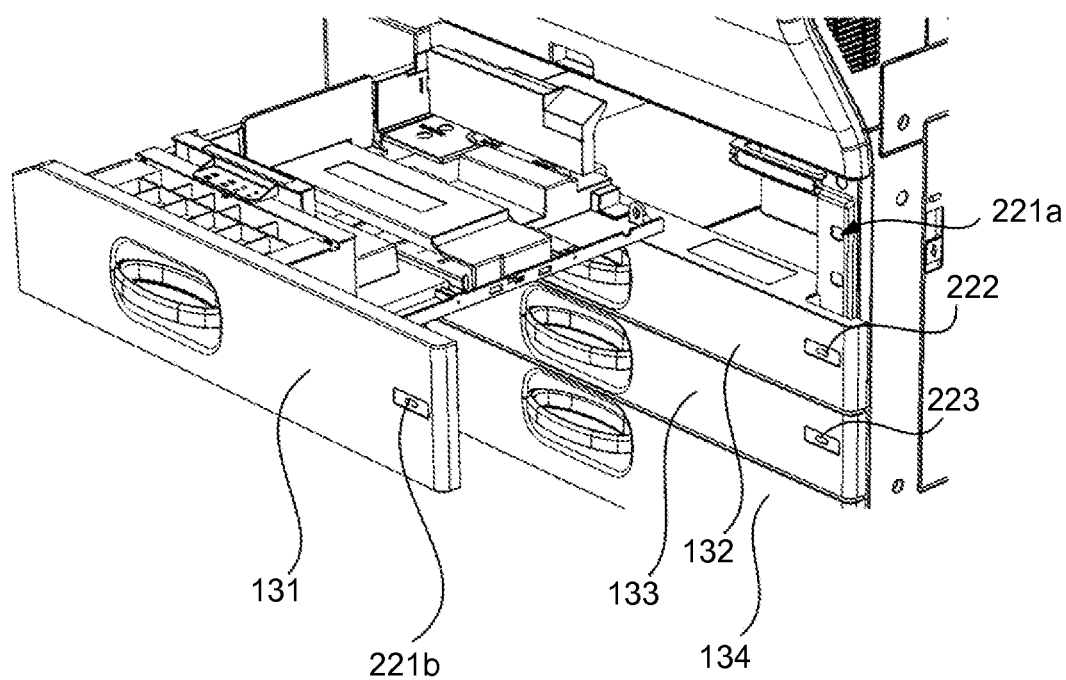
FIG. 10 is a perspective view illustrating a state in which a sheet feed tray of the image forming apparatus is drawn.
Figure 11:
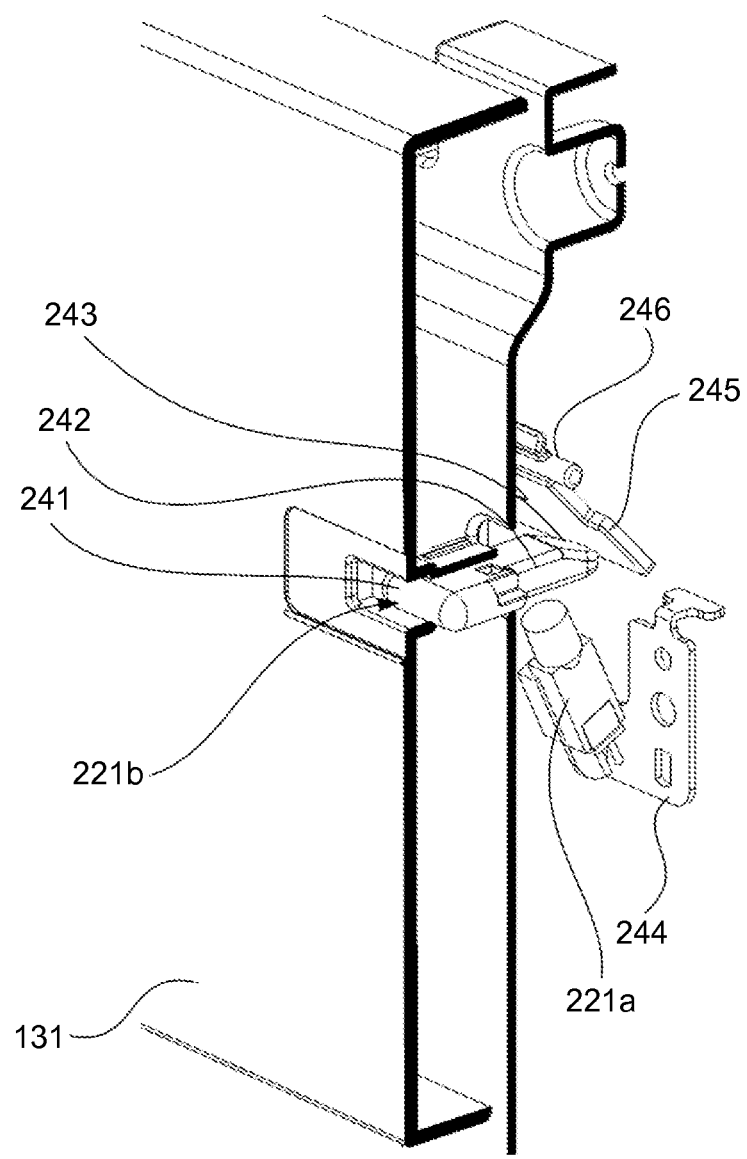
FIG. 11 is a perspective view including a partial cross-section illustrating a configuration example of the light-emitting member.

A case will be explained that the LED element and the light guide member are arranged separately. FIG. 10 is a perspective view illustrating a state in which the sheet feed tray of the image forming apparatus is drawn, and FIG. 11 is a perspective view including a partial cross-section illustrating a configuration example of the light-emitting member. In the sheet feed tray 131 on the uppermost stage of the image forming apparatus 100, for example, it is possible to arrange two bundles of recording media of A4 size side by side. In the sheet feed tray 131, when feeding of one bundle of the recording media is completed, the other bundle of the recording media arranged adjacent to the one bundle is automatically moved to continue sheet feeding. Therefore, in the sheet feed tray 131, the recording media can be supplied even when the first light-emitting member 221 is emitting light. Incidentally, in each of the other sheet feed trays 132, 133, and 134, only one bundle of recording media is arranged, so that it is difficult to draw the sheet feed trays 132, 133, and 134 and supply recording media while the first light-emitting members 222, 223, and 224 are emitting light.

The first light-emitting member 221 arranged on the sheet feed tray 131 includes an LED element 221a arranged on the main body 101 of the image forming apparatus and a light guide member 221b arranged on the sheet feed tray 131. The light guide member 221b is made of transparent synthetic resin, and includes an emission portion 241 that emits light and that has a three-dimensional shape, a light-guide unit 242 extending in a direction perpendicular to the sheet feed tray 131, that is, in the horizontal direction, and a light reflecting surface 243. The LED element 221a is inclined by about 60 degrees with respect to the light-guide unit 242 and is fixed to the main body 101 by a mounting member 244.

The LED element 221a emits continuous light even when the sheet feed tray 131 is drawn; therefore, it is necessary to prevent the light of the LED element 221a from entering the eyes of an operator. To cope with this, in the image forming apparatus 100 according to the second embodiment, a shutter 245 that moves with the movement of the sheet feed tray 131 is arranged as a light amount reducing member that reduces the light from the LED element 221a while the sheet feed tray 131 is drawn. The shutter 245 is arranged on the main body 101 so as to rotate about a shaft 246 and is continuously pressed by a spring (not illustrated) so as to be located in a position where the light from the LED element 221a is blocked.

When the sheet feed tray 131 is drawn from the main body 101, the shutter 245 blocks the LED element 221a to reduce emitted light. In contrast, when the sheet feed tray 131 is pushed in the main body 101, the shutter 245 is pushed inward by the light guide member 221b, so that the light from the LED element 221a enters the LED element 221a and is emitted from the emission portion 241. Therefore, even when the sheet feed tray 131 is drawn, it becomes possible to prevent the light from the LED element 221a from entering the eyes of an operator.

Figure 12:
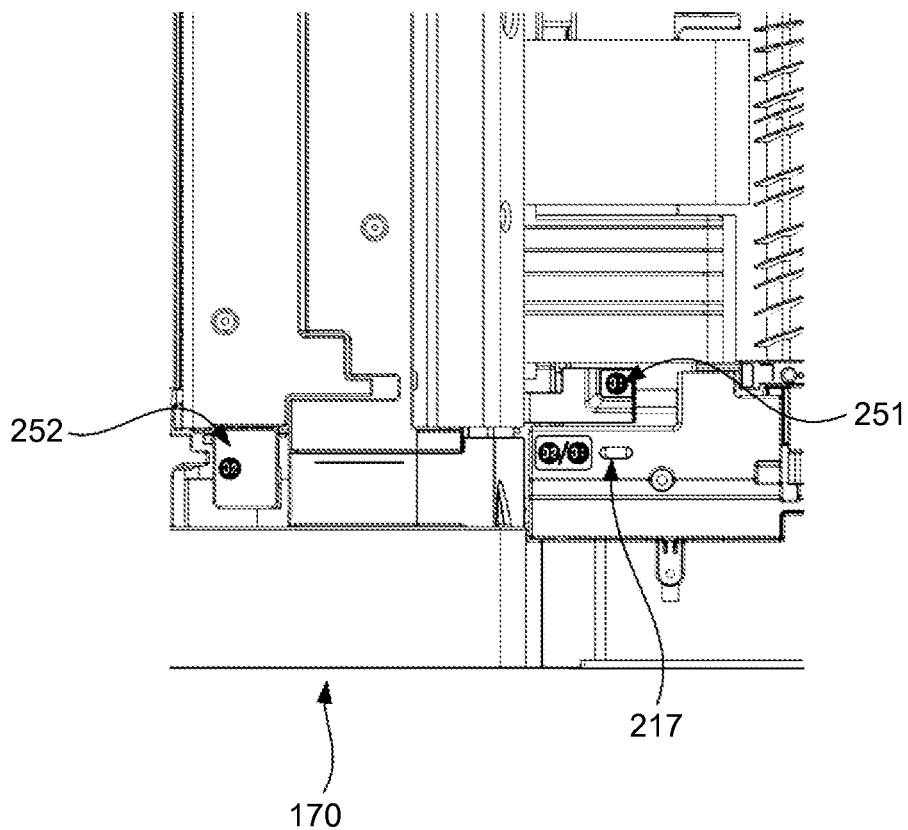
FIG. 12 is a perspective view illustrating an example in which multiple operating members are designated by a single light-emitting member.

In the image forming apparatus 100, it is desirable to arrange a single second light-emitting member for the operating member of a single movable member, in a one-to-one relationship. However, in some cases, it may be difficult to arrange the second light-emitting member for the operating member in a one-to-one relationship because of limitations of arrangement spaces or costs. In this case, a single second light-emitting member is configured to designate multiple operating members. FIG. 12 is a perspective view illustrating an example in which a single second light-emitting member guides operation of multiple operating members. In this example, in the drawer unit 170, a single second light-emitting member 217 is arranged in accordance with levers 251 and 252 that are two operating members associated with each other to perform sequential operation.

A decal with a unique description is attached to each of the two levers 251 and 252 (for example, decals in which different numbers are written). Meanwhile, the lever 252 is to be operated after the lever 251 is operated. When the two levers 251 and 252 are arranged in separate positions, as illustrated in FIG. 12, it is preferable to arrange the second light-emitting member 217 in a position close to the lever 251 to be operated first in the operation sequence. This makes it possible to guide a user to operate the levers according to the operation sequence.

In this case, light emission of the second light-emitting member 217 is controlled as described below. The second light-emitting member 217 is controlled so as not to turn off when only the lever 251 configured to be operated first in the sequence is operated, and so as to turn off upon detecting completion of the operation of the lever 252 configured to be operated next. Therefore, it becomes possible to guide a user to operate the two levers 251 and 252 by the single second light-emitting member 217. Incidentally, when the two levers 251 and 252 are arranged close to each other, the second light-emitting member 217 is arranged in the intermediate position.

Another example will be explained below, in which a single second light-emitting member prompts operation of multiple operating members. It is assumed that a first operating member, such as a handle, is arranged on the movable member, such as a door or a drawer member, and when the movable member is opened, second and third operating members, such as handles, to be operated subsequent to the first operating member appear. Furthermore, the second light-emitting member as described above is arranged near the first operating member to prompt operation of the first operating member, and a decal indicating the positions or unique numbers of the second and the third operating members is attached near the second light-emitting member. Incidentally, when the decal containing the unique numbers of the second and the third operating members is to be used, decals containing unique descriptions are respectively attached to the second operating member and the third operating member.

When the second light-emitting member arranged near the first operating member first emits light, a user can check the decal containing the positions or the unique numbers of the second and the third operating members, so that he/she can know the number of the operating members to be operated after opening the movable member and the operation sequence in advance. Therefore, it becomes possible to prompt the user to operate the second and the third operating members even when the second light-emitting member is not arranged on each of the second and the third operating members. Incidentally, after the movable member is opened, the second light-emitting member arranged near the first operating member may be turned off.

Furthermore, if the user does not notice the second and the third operating members and closes the movable member without operating the second and the third operating members, the second light-emitting member emits light again to notify the user that there are operating members that need to be operated in addition to the first operating member.

Moreover, in some cases, an operating member user to remove a recording medium may be arranged in a position that is not easily viewed. In this case, even if the second light-emitting member is arranged near such an operating member, it is difficult to confirm light emitted from the second light-emitting member. Therefore, the second light-emitting member is arranged in a position that can easily be viewed, and a chart or directions may be displayed near the second light-emitting member to guide the operating member. By arranging such a guide, it becomes possible to designate multiple operating members arranged in different positions by a single second light-emitting member.

Third Embodiment

Figure 13:
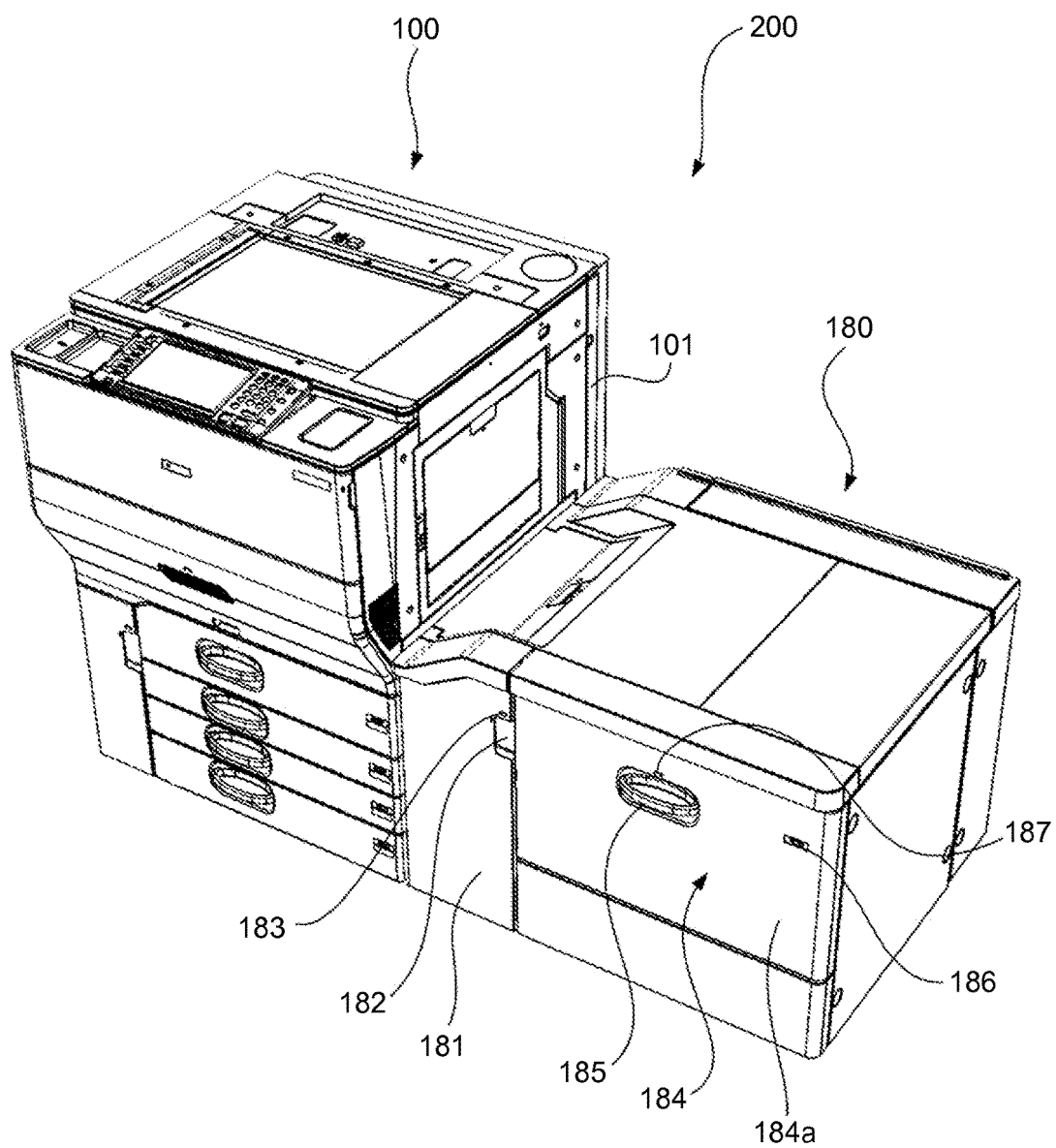
FIG. 13 is a perspective view illustrating appearance of an image forming system according to a third embodiment of the present invention.
Figure 14:
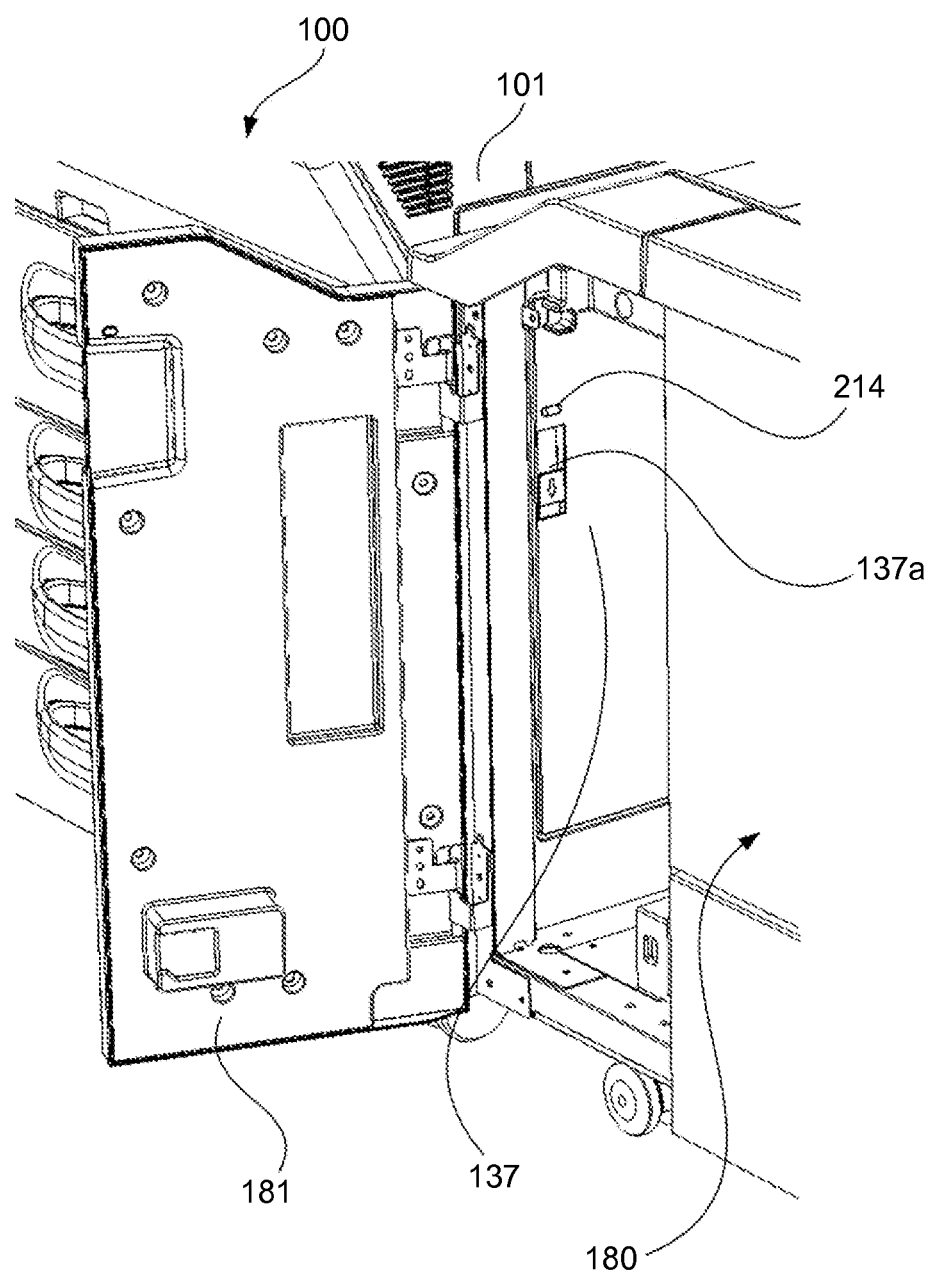
FIG. 14 is a perspective view illustrating a state in which a door of a large-capacity recording medium supply device of the image forming system is opened.
Figure 15:
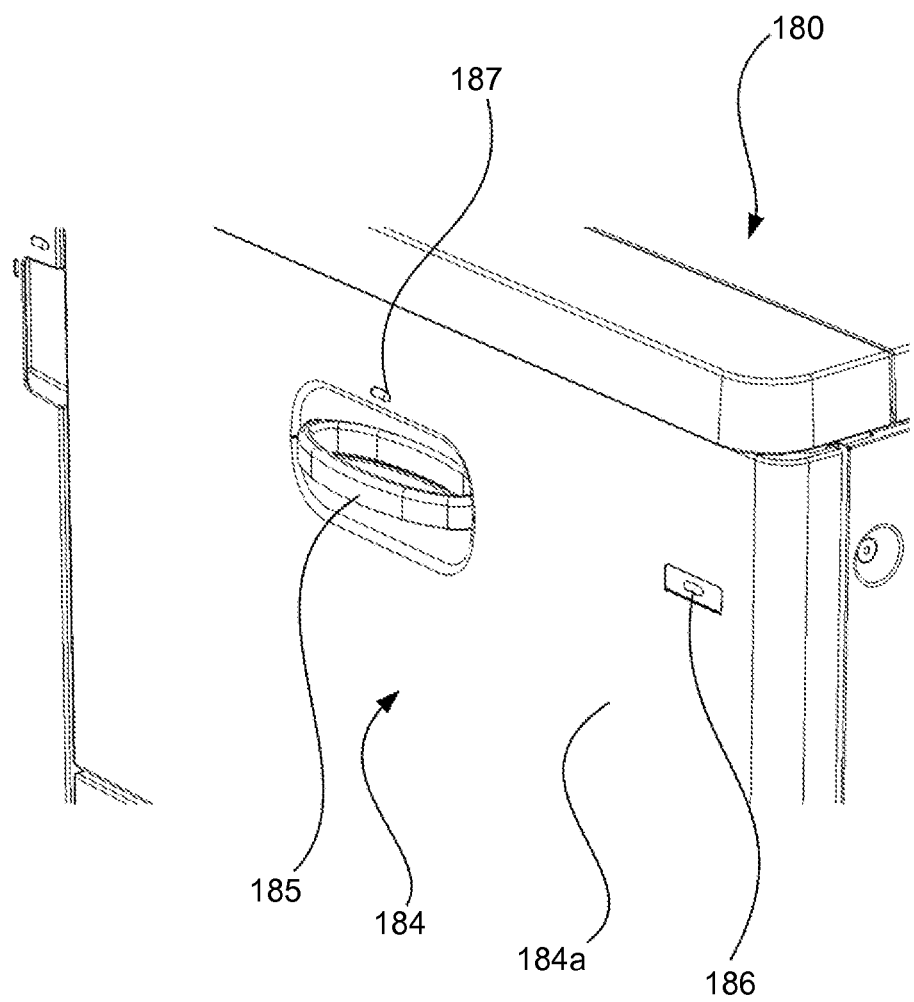
FIG. 15 is an enlarged perspective view of the large-capacity recording medium supply device of the image forming system.

An image forming system according to a third embodiment of the present invention will be explained below. It may be possible to attach a large-capacity recording medium supply device or a post-processing device to the image forming apparatus 100 of the second embodiment to form an image forming system. In this case, it may be possible to arrange the second light-emitting members on operating members in the recording medium supply device or the post-processing device. In the following, an example will be explained in which a recording medium supply device (large capacity tray (LCT)) 180 as a large-capacity recording medium supply device is attached to the image forming apparatus 100. FIG. 13 is a perspective view illustrating appearance of the image forming system according to the third embodiment, FIG. 14 is a perspective view illustrating a state in which a door of the large-capacity recording medium supply device of the image forming system is opened, and FIG. 15 is an enlarged perspective view of the large-capacity recording medium supply device of the image forming system.

An image forming system 200 includes the recording medium supply device 180 and the image forming apparatus 100, which are connected to each other. On the recording medium supply device 180, a large capacity feed tray 184 is arranged as a supply-device recording medium setting unit, and recording media are conveyed from the large capacity feed tray 184 to the image forming apparatus 100. Incidentally, the recording medium supply device 180 is arranged so as not to be detached easily from the main body 101 of the image forming apparatus 100. Therefore, the recording-medium-storage-unit door 137 of the image forming apparatus 100 (see FIG. 14) is hidden by the recording medium supply device 180.

Therefore, in the image forming apparatus 100, a front door 181 to be opened and closed by a handle 182 serving as a supply-device operating member is arranged, and a front-door light-emitting member 183 serving as a fourth light-emitting member is arranged near the handle 182 serving as the operating member. Furthermore, recording media are stored in the large capacity feed tray 184. On a front panel 184a of the large capacity feed tray 184, a handle 185 and a third light-emitting member 186 configured to indicate that the recording media are being supplied from the large capacity feed tray 184 are arranged. Moreover, on the front panel 184a of the large capacity feed tray 184, a fourth light-emitting member 187 configured to display that a recording medium is jammed in a conveying path of the recording medium supply device 180 is arranged. Incidentally, on the recording medium supply device 180, a supply-device remaining-recording-medium detecting unit (not illustrated) is arranged to detect presence or absence of a recording medium remaining in a main body of the recording medium supply device.

The recording medium supply device 180 is electrically connected to the image forming apparatus 100 and operates under control of the image forming apparatus 100. Therefore, light emission of the third light-emitting member 186 of the recording medium supply device 180 is controlled by the light emission control unit 310 of the image forming apparatus 100 in the same manner as the first light-emitting member of the image forming apparatus 100, and light emission of the front-door light-emitting member 183 and the fourth light-emitting member 187 of the recording medium supply device 180 is controlled in the same manner as the second light-emitting member of the image forming apparatus 100. Specifically, the front-door light-emitting member 183 and the fourth light-emitting member 187 emit light when it is necessary to operate the operating members to remove a paper jam. Furthermore, the third light-emitting member and the fourth light-emitting member emit light in different manners. For example, the shapes of light-emitting portions, colors of light, light emission timings are changed.

In the recording medium supply device 180, when recording media are fed from the large capacity feed tray 184, the third light-emitting member 186 emits light. In this state, if a paper jam occurs, the fourth light-emitting member 187 emits light of a different color from that of the light from the third light-emitting member 186. Therefore, it becomes possible to notify that the paper jam has occurred in the recording medium supply device 180.

Furthermore, in the image forming system 200, if a recording medium is jammed in the vertical conveying path of the recording medium storage unit 130, the following process is performed. First, if the remaining-recording-medium detecting unit 330 of the image forming apparatus 100 detects a paper jam in the vertical conveying path of the image forming apparatus 100, the light emission control unit 310 causes the front-door light-emitting member 183 arranged near the handle 182 of the front door 181 of the recording medium supply device 180 to emit blinking light. If the front door 181 is opened in response to the blinking light, the front-door light-emitting member 183 is turned off. Subsequently, the recording-medium-storage-unit-door light-emitting member 214 of the recording-medium-storage-unit door 137 of the image forming apparatus 100 emits blinking light. If the recording-medium-storage-unit door 137 is opened to remove the recording medium from the vertical conveying path of the recording medium storage unit 130, and if the recording-medium-storage-unit door 137 is closed after the recording medium is removed, the recording-medium-storage-unit-door light-emitting member 214 is turned off. Then, the front door 181 is closed and a recording medium removal process is completed.

Incidentally, in this example, as illustrated in FIG. 15, the third light-emitting member 186 and the front-door light-emitting member 183 serving as the fourth light-emitting member are arranged on the same front panel 184*a*. In this case, by arranging the third light-emitting member 186 and the front-door light-emitting member 183 in different positions, it becomes possible to prevent confusion between the two light-emitting members. Furthermore, it becomes possible to display a pictogram indicating a paper jam or a recording medium, in a position adjacent to each of the light-emitting members. The pictogram may be displayed by printing or by using decals. Such a display may be applied to the image forming apparatus 100 of the first and the second embodiments.

According to the image forming system 200 of the third embodiment, the third light-emitting member arranged on the recording medium storage unit and the fourth light-emitting member indicating an operating member used to remove a recording medium emit light in different manners. Therefore, the third light-emitting member and the fourth light-emitting member can easily be distinguished from each other without confusion. Consequently, it becomes possible to prevent erroneous operation. Furthermore, the operating members that need to be operated are sequentially designated by light emitted by the fourth light-emitting members, so that it becomes possible to easily remove jammed recording media without a failure. Incidentally, while an example is explained in which the image forming apparatus 100 controls light emission of the recording medium supply device 180, the recording medium supply device 180 may include a light emission control unit to control the first light-emitting member and the second light-emitting member.

According to an embodiment of the present invention, it becomes possible to easily distinguish between the first light-emitting member and the second light-emitting member of the image forming apparatus without confusion, enabling to prevent erroneous operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a first light-emitting unit that is arranged on an outer surface of a recording medium setting unit on which recording media are set and that emits light while the recording media are being conveyed from the recording medium setting unit;
   a second light-emitting unit that is arranged on or near a first operating member that is to be operated when a recording medium jammed in a main body of the image forming apparatus is removed; and
   a remaining-recording-medium detector that detects presence or absence of a recording medium remaining in the main body of the image forming apparatus, wherein
   the second light-emitting unit emits light when the first operating member needs to be operated, based on a result of detection by the remaining-recording-medium detector, and,
   the first light-emitting unit and the second light-emitting unit emit light in different manners, wherein
   the recording medium setting unit into which recording media is supplied is configured to be drawn from the main body of the image forming apparatus,
   the first light-emitting unit includes a light-emitting element and a light guide unit that guides light emitted by the light-emitting element so that the light is outputs via an emission portion,
   the light guide unit is arranged on the recording medium setting unit and the light-emitting element is arranged on the main body of the image forming apparatus such that when the recording medium setting unit is housed in the main body of the image forming apparatus, light from the light-emitting element is emitted via the emission portion of the light guide unit, and
   the image forming apparatus further comprises a light-amount reducing unit that covers the light-emitting element in conjunction with movement of the recording medium setting unit when the recording medium setting unit is drawn from the main body of the image forming apparatus.

2. The image forming apparatus according to claim 1, wherein a color of the light emitted by the first light-emitting unit and a color of the light emitted by the second light-emitting unit differ from each other.

3. The image forming apparatus according to claim 1, wherein
   a color of the light emitted by the first light-emitting unit is in a wavelength range of 460 nanometers to 480 nanometers, and
   a color of the light emitted by the second light-emitting unit is in a wavelength range of 610 nanometers to 630 nanometers.

4. The image forming apparatus according to claim 1, wherein a light emission cycle of the first light-emitting unit and a light emission cycle of the second light-emitting unit differ from each other.

5. The image forming apparatus according to claim 1, wherein
   the first light-emitting unit emits continuous light, and
   the second light-emitting unit emits blinking light.

6. The image forming apparatus according to claim 1, wherein
   a planar shape of a light-emitting portion of the first light-emitting unit on a mounting surface and a planer shape of a light emission portion of the second light-emitting unit on a mounting surface differ from each other.

7. The image forming apparatus according to claim 1, wherein
   a light-emitting portion of the first light-emitting unit is arranged on an inner side of a mounting surface, and
   a light-emitting portion of the second light-emitting unit is arranged so as to protrude outward relative to a mounting surface.

8. The image forming apparatus according to claim 1, wherein
   a light-emitting portion of each of the first light-emitting unit and the second light-emitting unit is surrounded by a frame on a mounting surface, and
   a shape of the frame of the first light-emitting unit and a shape of the frame of the second light-emitting unit differ from each other.

9. The image forming apparatus according to claim 1, further comprising:
   a second operating member and a third operating member that are to be operated when a recording medium jammed in the main body of the image forming apparatus is removed; and a third light-emitting unit that emits light based on a result of the detection by the remaining-recording-medium detector, wherein the third operating member is to be operated after the second operating member is operated, the third light-emitting unit is arranged in a position closer to the second operating member than to the third operating member, and the third light-emitting unit emits light until operation of the second and third operating members is completed and turns off when the operation of the second and third operating members is completed.

10. The image forming apparatus according to claim 1, further comprising a movable unit on which the first operating member is arranged; and a second operating member that is arranged so as to appear when the movable unit is opened and that is to be operated after operation of the first operating member is completed, wherein a description indicating the second operating member is provided near the second light-emitting unit.

11. The image forming apparatus according to claim 1, further comprising a surface member arranged in an arrangement position of the first light-emitting unit, wherein the surface member is one of a first surface member including a transparent portion through which the light from the first light-emitting unit is transmitted and a second surface member made of a non-transparent material that prevents the first light-emitting unit from being viewed.

12. The image forming apparatus according to claim 1, wherein the recording medium setting unit includes a detecting unit that detects whether the recording media are being conveyed, and the first light-emitting unit emits light when the detecting unit detects the recording media are being conveyed, and does not emit light when the detecting unit does not detect the recording media are being conveyed.

* * * * *